R. N. SIKES.
COMBINED BRUSH AND CURRYCOMB.
APPLICATION FILED OCT. 17, 1911.
1,036,736.
Patented Aug. 27, 1912.
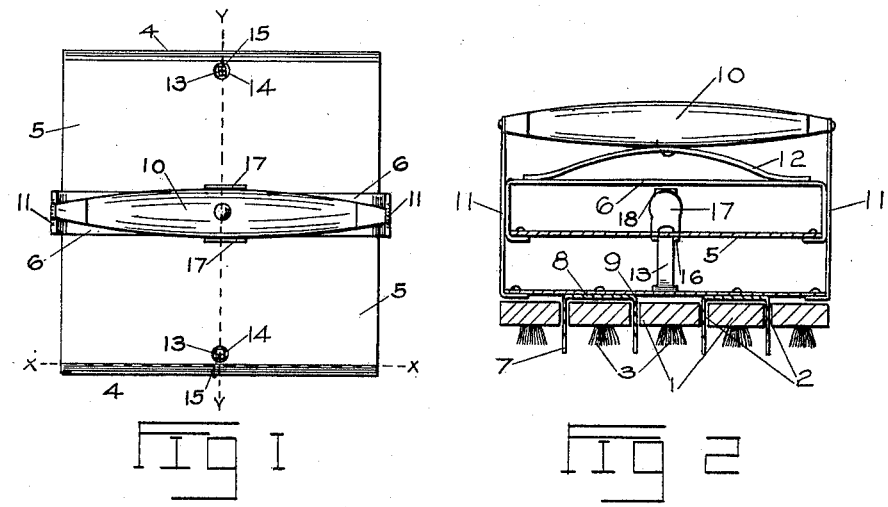
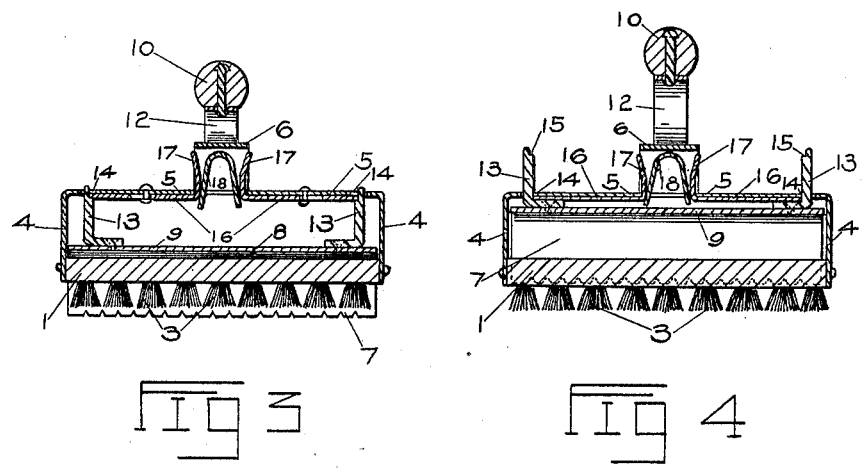
WITNESSES:
INVENTOR
Rufus N. Sikes.
BY
ATTORNEY

UNITED STATES PATENT OFFICE.

RUFUS N. SIKES, OF BURLESON, TEXAS.

COMBINED BRUSH AND CURRYCOMB.

1,036,736.

Specification of Letters Patent. Patented Aug. 27, 1912.

Application filed October 17, 1911. Serial No. 655,205.

*To all whom it may concern:*

Be it known that I, RUFUS N. SIKES, a citizen of the United States, residing at Burleson, in the county of Johnson and State of Texas, have invented certain new and useful Improvements in Combined Brushes and Currycombs, of which the following is a specification.

My invention relates to an improved form of combined brush and curry-comb.

The object of the invention is to provide a device which will combine in one implement the functions of a brush and curry-comb such as are commonly employed to clean horses, thus accomplishing a saving of time by eliminating the necessity of frequently laying down one implement and taking up the other.

The object of the invention, more specifically stated, is to provide an implement for cleaning horses, consisting of a brush, the body of which will be provided with a plurality of parallel slits, through which will project the toothed blades of a curry-comb mounted upon a suitable back adapted to be adjusted with regard to the space separating it from the body of the brush.

A further object of the invention is to provide a novel mechanism by which the two component members of the implement may be automatically held in a rigid relation to each other in either of their two positions of adjustment.

Finally the object of the invention is to provide a device of the character described that will be strong, durable, simple and efficient, and comparatively easy to construct, and also one the various parts of which will not be likely to get out of working order.

With these and various other objects in view, my invention has relation to certain novel features of construction and operation, an example of which is described in the following specification, and illustrated in the accompanying drawing, wherein:

Figure 1 is a top view of the herein described combined brush and curry-comb. Fig. 2 is a vertical sectional view of the same, the section being taken upon the line x—x of Fig. 1. Fig. 3 is another vertical sectional view of the implement, the section being taken upon the line y—y of Fig. 1 in a plane at right angles with the section x—x. Fig. 4 is a vertical sectional view of the implement taken upon the line y—y of Fig. 1, and different from Fig. 3 in that it shows the brush in condition for use, and the curry-comb in an inoperative position.

Referring now more particularly to the drawings, wherein like numerals of reference designate similar parts in all the figures, the numeral 1 denotes a plurality of parallel strips, separated from each other by narrow slits 2, and each provided with a row of bristles 3, the several rows of bristles acting together to form the brush. The strips 1 have their extremities rigidly mounted between the down-turned ends 4 of a rectangular plate 5, the area of which plate is equal to the combined area of the strips 1. Upon the plate 5 is surmounted a spaced strip 6, forming a bridge, said strip extending in a direction transverse with the strips 1. Through each of the slits 2 there projects a serrated blade 7, said blades being preferably arranged in correlated pairs, each pair forming an inverted channel in conjunction with an integral connecting member 8. The members 8 are rigidly secured by riveting or another suitable manner to a metallic back 9, adapted, in a manner presently to be described, to be adjusted with relation to its distance from the strips 1. The length of the blade 7 is such that said blade will be in position for use forming a curry-comb when the plate 5 is contiguous with the rear surfaces of the strips 1. A handle member 10 is supported a short distance above the strips 6, and parallel with said strips by a pair of parallel arms 11, said arms being oppositely secured to the plate 8. A spring 12 has its center attached to the under side of the handle member 10, the extremities of said spring bearing upon the strip 6, and tending to force the brush member downward with relation to the curry-comb member. The tendency of the spring 12 in expanding therefore is to displace the curry-comb to an inoperative position as is shown in Fig. 4.

When the operator wishes to make use of the curry-comb, the natural tendency of the spring 12 must be counteracted. In accomplishing this result, the operator grasps the handle 10 with the palm of his hand, and passing his fingers beneath the bridge member 6, exerts an upward pressure upon said member, thus displacing the same with its correlated parts toward the handle, and compressing the spring 12.

In order that the operator may not be obliged to constantly exert an upward pressure upon the strip 6 while using the curry-comb, it is necessary to provide some means by which the curry-comb may be held in its operative position. To accomplish this result, a pair of small posts 13 are rigidly mounted upon the plate 5, adjacent to opposite edges of said plate. The posts 13 pass through apertures 14, provided in the plate 5, and said posts are provided adjacent to their upper extremities with small shoulders 15. When the curry-comb member has been adjusted to its operative position, by displacing the strip 6 toward the handle member, the plate 5 will be contiguous with the strips 1, and the shoulders 15 upon the posts 13 will occupy a position just beneath the plate 5. In this position, said shoulders will be engaged by the extremities of two slide-bars 16, the other extremities of said slide-bars being turned upward, as indicated at 17, and spaced from each other. The members 16 are acted upon by a constant force tending to force said members apart, this force being created by a bent spring 18, having approximately the form of an inverted U, said spring being under compression, and having its extremities bearing against the upwardly turned extremities 17 of the members 16. Owing to the action of the spring 18, as soon as the curry-comb member has been adjusted to its operative position, the extremities of the members 16 will be received by said shoulders, thus preventing the strip 6 from being displaced away from the handle 10 under the action of the spring 12 when manual upward pressure upon said member 6 is discontinued.

From the above description, the use and operation of the implement will be apparent. Without laying down the implement, the operator can change its function from that of a curry-comb to that of a brush, or vice versa. It often happens that a person in cleaning horses is not within reach of any support upon which to place his brush and curry-comb, and when one of these is in use, the other must be placed upon the ground. In such a case, a considerable amount of time will be lost in exchanging the brush for the curry-comb, or vice versa.

It is apparent that various changes and modifications may be made in the form and proportion of parts of the above described invention without departing from the spirit or sacrificing the advantages thereof, and the device is therefore presented as including all such changes as come within the scope of the following claims.

What I claim is:

1. An implement for cleaning horses, comprising a curry comb and a brush, the body of the brush being provided with slits through which the blades project, resilient means by which the bodies of the brush and curry comb are normally held spaced from each other, and spring-actuated means adapted to automatically hold said bodies closely adjacent when said parts are adjusted to such a position.

2. An implement for cleaning horses, comprising a brush having a plurality of parallel slits formed in its back, a plate rigidly supported from the back of the brush and spaced therefrom, a curry comb comprising a back plate and a plurality of parallel, serrated blades mounted at right angles thereupon, the back plate being mounted between the first mentioned plate and the brush body, the slits of the latter being respectively made to receive the blades of the curry comb, means by which the bodies of the brush and curry comb are normally held spaced from each other, a pair of posts projecting at right angles from the back plate of the curry comb and passing through apertures in the plate supported from the brush, said posts being respectively adjacent to opposite edges of the back plate, and being formed with shoulders at their free ends, and means for engaging said shoulders mounted upon the plate supported from the brush, the engagement being established when said plate is at a maximum distance from the back plate of the curry comb.

3. An implement for cleaning horses, comprising a brush having a plurality of parallel slits formed in its back, a plate rigidly supported from the back of the brush, and spaced therefrom, a curry comb comprising a back plate and a plurality of parallel, serrated blades mounted at right angles thereupon, the back plate being mounted between the first mentioned plate and the brush body, the slits of the latter being respectively made to receive the blades of the curry comb, resilient means by which the bodies of the brush and curry comb are normally held spaced from each other, a pair of posts projecting at right angles from the back plate of the curry comb and passing through apertures in the plate supported from the brush, said posts being respectively adjacent to opposite edges of the back plate, and spring-actuated means correlated with the extremities of said posts to automatically hold them in a fixed relation to the plate supported by the brush when brought adjacent to said plate.

In testimony whereof I have signed my name to this specification in the presence of two subscribing witnesses.

RUFUS N. SIKES.

Witnesses:
  S. DAVIS,
  J. A. GILKERSON.